United States Patent [19]
Hall, Jr.

[11] Patent Number: 5,346,116
[45] Date of Patent: Sep. 13, 1994

[54] MACHINE FOR FORMING A METAL STRIP INTO A TUBULAR FORM HAVING A STOP-RESTART DISPLACEMENT MECHANISM

[76] Inventor: Bertie F. Hall, Jr., 5179 Christine Ct., Ann Arbor, Mich. 48103

[21] Appl. No.: 81,641

[22] Filed: Jun. 24, 1993

[51] Int. Cl.$^5$ .............................................. B23K 9/02
[52] U.S. Cl. .................................... 228/148; 219/61; 219/130.4; 228/26
[58] Field of Search ................... 228/147, 148, 26, 15; 219/130.4, 61

[56] References Cited

U.S. PATENT DOCUMENTS

| | | | |
|---|---|---|---|
| 3,729,125 | 4/1973 | Hano | 228/26 |
| 4,269,639 | 5/1981 | Lewis | 228/148 |
| 4,628,180 | 12/1986 | Edberg | 219/130.4 |
| 4,673,121 | 6/1987 | Holmgren | 228/148 |

FOREIGN PATENT DOCUMENTS 2237223A  5/1991  United Kingdom.

Primary Examiner—Kenneth J. Ramsey
Attorney, Agent, or Firm—Brooks & Kushman

[57] ABSTRACT

A machine for continuously producing metal tubing from a flat metal strip in which the welder, weld closing rolls, and seam guide are attached to a base plate slidably attached to a support structure. The base plate is displaceable relative to the support structure between an operating position and a start position. The base plate may be displaced by a manually operated actuator or by an electromechanical mechanism. The base plate is placed in the start position when the machine is stopped and is slowly displaced to the operating position when the machine is restarted. During displacement of the base plate to the operation position, the welder overwelds a portion of the seam previously welded. The seam weld during a restart transition of the base plate from the start to the operating position produces a defect-free seam weld.

31 Claims, 3 Drawing Sheets

MACHINE FOR FORMING A METAL STRIP INTO A TUBULAR FORM HAVING A STOP-RESTART DISPLACEMENT MECHANISM

TECHNICAL FIELD

The invention is related to the field of machines for continuously forming hollow tubing from flat metal strips and, in particular, to a mechanism which permits the machine to produce defect-free seam welds when the machine is stopped and restarted.

BACKGROUND ART

In the manufacture of tubing by forming flat metal strips into a hollow tubular form, then welding the seam formed by the abutting longitudinal edges, it is difficult to stop and restart the manufacturing process without creating a hole in the welded seam. For long runs, it is necessary to stop the manufacturing process to re-sharpen the electrode of the welder or add new stock. This becomes of considerable importance when one or more wires are being fed into the hollow tubing as it is being formed and when the hollow tubing is being continuously filled with a ceramic powder to insulate the one or more wires from each other and from the metal tube sheathing these wires. It is vital that no holes be generated along the seam during a stop and subsequent restart of the process so that the ceramic powder will be contained within the tubing as it is formed and not contaminate the welding area.

The problem of holes being formed in the welded seam upon restarting of the tube forming machine after having been stopped was addressed by Filler in British Patent No. 2 237 223 A. In the process of manufacturing mineral insulated cables disclosed by Filler, the axial position of the welding heads are adjustable to enable a new weld to overlap a portion of the seam welded prior to the process being stopped. Filler provides a servo mechanism which adjusts the position of the welding heads so that the desired weld overlap occurs.

The present invention is an improvement ever the tube forming method and apparatus taught by Filler.

SUMMARY OF THE INVENTION

The invention is a machine for continuously forming hollow tubing and in particular for making a mineral insulated metal shielded cable for electrical heating or for making a sheathed thermocouple for temperature measurements. The invention includes a base plate slidably mounted on a support structure. The base plate is displaceable between a start position and an operating position. At least one pair of forming rolls are rotatably attached to the base plate which partially form a received flat metal strip into a tubular form. A pair of weld closing rolls are attached to the base plate at a location downstream from the pair of forming rolls, the weld closing roll completing the forming of the metal strip into the desired tubular form. The longitudinal edges of the metal strip after passing through the weld closing roll are abutted to each other and form a longitudinal seam. A welder attached to the base plate at a location downstream of the weld closing rolls welds together the longitudinal edges of the formed metal strip and seals the seam. A seam guide is disposed between the at least one pair of forming rolls and the pair of weld closing rolls to align the longitudinal seam with the welder. The seam guide is attached to the base plate and its position is fixed relative to the weld closing rolls.

A mechanism is connected between the support structure and the base plate to displace the base plate between its start and operating positions in a direction parallel to the axis of the tubing being formed. The base plate in the start position locating the attached welder over a previously welded portion of the formed tubing. Upon restarting the tube forming process, the base plate is slowly displaced to its normal operating position. This displacement of the base plate from the start position to the operating position and vice-versa simultaneously moves at least the welder, weld closing rolls and the seam guide as a unit.

One advantage of the machine is that during a restart, the new seam weld overlaps a portion of the seam previously welded before it was stopped, eliminating the formation of holes in the welded seam.

Another advantage of the machine is that the axial location of the welder, the weld closing rolls and at least the seam guide relative to each other during the restart is the same as during normal operation of the machine.

Still another advantage is that the machine is adaptable to forming powder ceramic sheathed cables and sheathed thermocouples.

Another advantage is that the welded tubing produced by the machine may be subsequently drawn to a smaller diameter or mechanically worked without defects.

These and other advantages will become more apparent from a reading of the specification in conjunction with the drawings.

BEST MODE FOR CARRYING OUT THE INVENTION

Figures 1, 2:
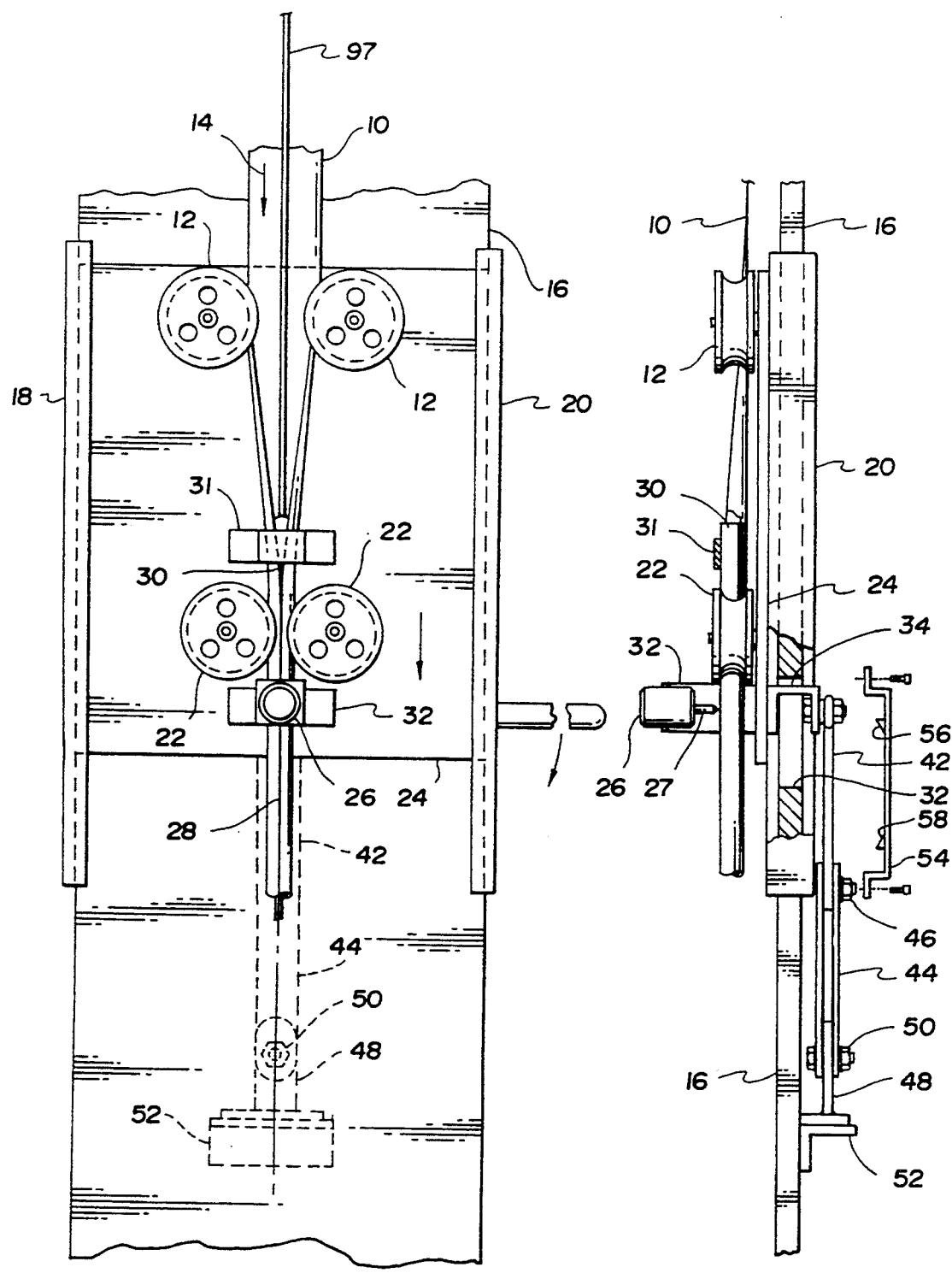
FIG. 1 is a partial front view of the tube forming machine showing the essential elements of the invention.
FIG. 2 is a partial side view of a portion of the tube forming machine shown in FIG. 1.
Figures 3, 4:
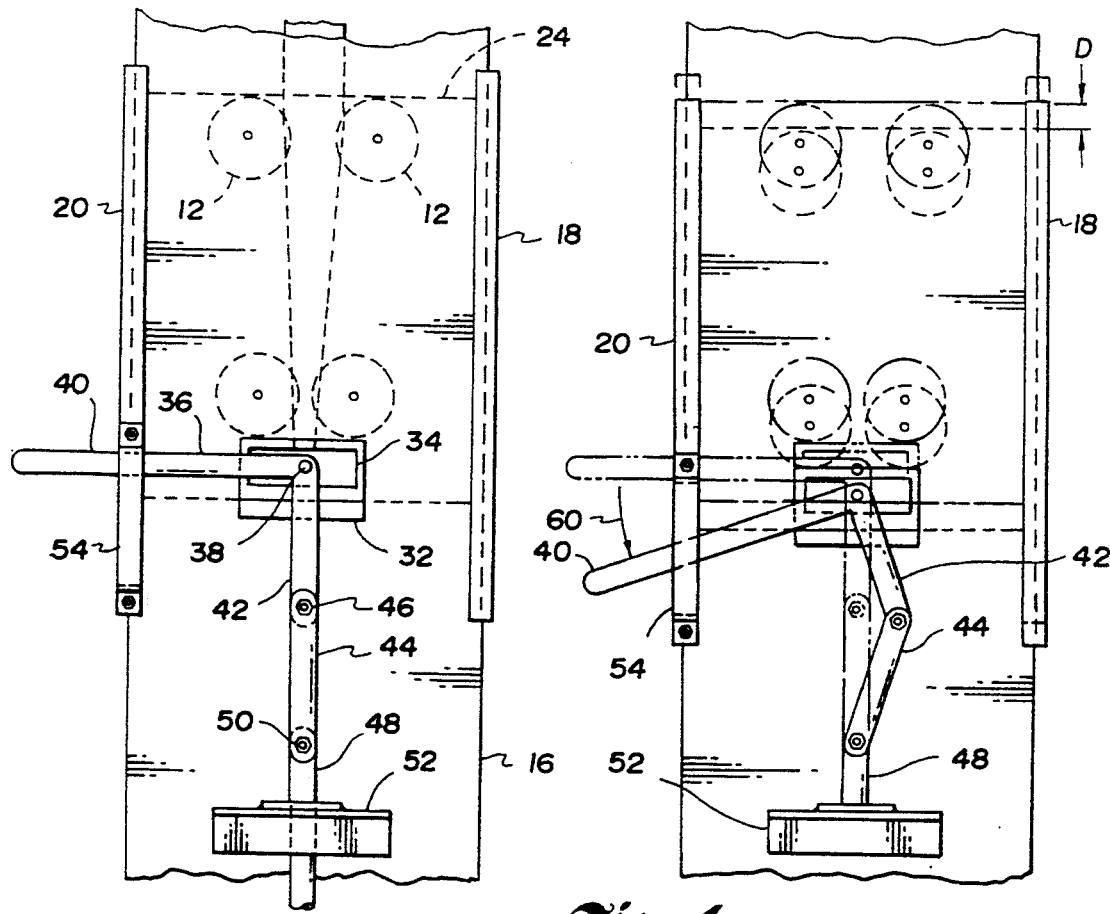
FIG. 3 is a partial rear view of the portion of the tube forming machine shown in FIG. 1.
FIG. 4 is a partial rear view illustrating the displacement of the base plate by the manually activated actuator.
Figure 7:
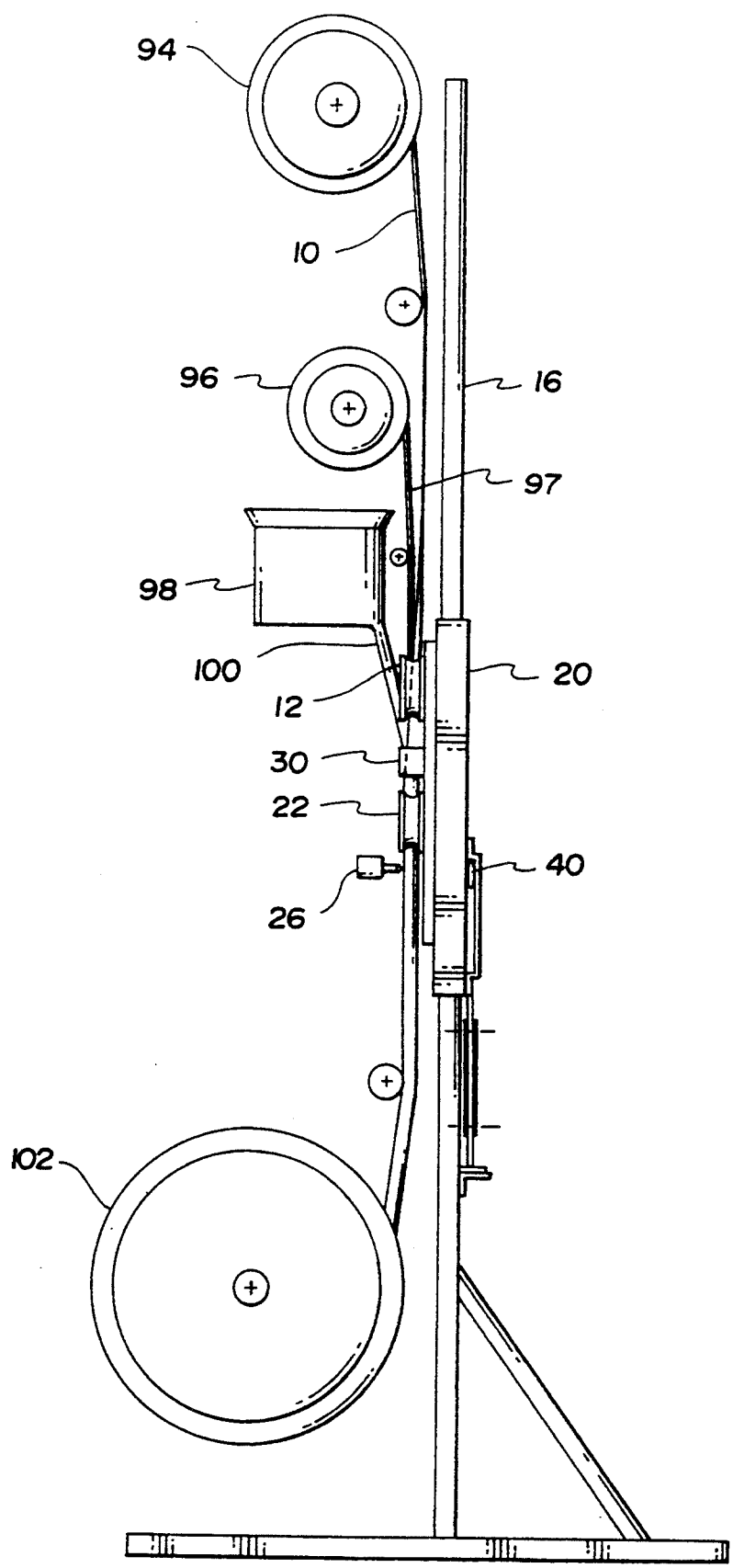
FIG. 7 is a side view of the machine having a metal strip source, a wire source and a powder ceramic source.

The details of the machine for forming a metal strip into tubular form and for welding the seam of the formed metal strip to continuously produce a metal tube are shown in FIGS. 1-3. In this machine, a flat metal strip 10 from a metal strip roll as shown in FIG. 7 is fed through at least one pair of opposed forming rolls 12 in the direction indicated by arrow 14 to initiate the bending of the flat metal strip 10 into a tubular form. Although only one pair of forming rolls 12 is shown, more than one pair of forming rolls disposed upstream of forming rolls 12 may be used or may be required depending on the width and/or thickness of the metal strip 10.

Figure 5:
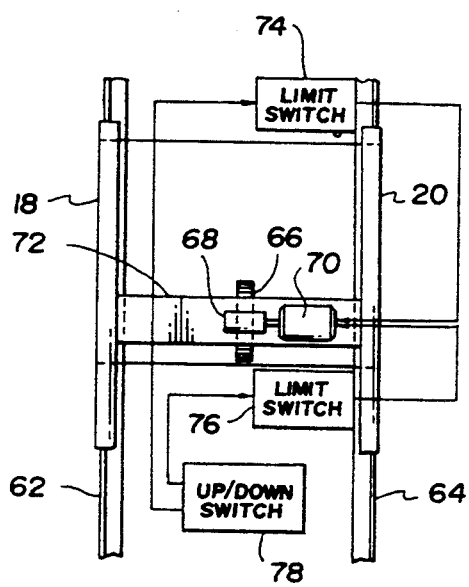
FIG. 5 shows a first electromechanical mechanism for displacing the base plate.

The pair of forming rolls 12 are rotatably attached to a base plate 24 which is slidably attached to a support member 16. In the preferred embodiment, the support member 16 may be a solid plate as shown, made from metal or wood, or may be a multicomponent assembly as shown in FIGS. 4 and 5. Preferably, the support member 16 is vertically oriented as shown, but may be at any desired angle to the vertical, including a horizontal position.

Slidably attached on opposite sides of the support member 16 are a pair of guides 18 and 20, respectively. The guides 18 and 20 preferably have a "C" or channel-shaped cross-section and straddle opposite sides of the support member 16 as shown.

A low friction material, such as nylon or teflon pads or strips, may be provided between the guide members 18 and 20 and the support member 16 to permit the guide members 18 and 20 to slide freely along the edges of the support member 16.

After passing through the pair of forming rolls 12, the partially formed metal strip 10 is received by a pair of weld closing rolls 22 which also are rotatably attached to the base plate 24. The base plate 24 is fixedly attached to the guide members 18 and 20 and is displaceable relative to the support member 16. The weld rolls 22 complete the forming of the metal strip 10 into a tubular shape as is known in the art.

An arc welder head 26, mounted on the base plate 24 downstream of the weld rolls 22, welds the seam 28 formed by opposing edges of the metal strip 10 after it has been formed into the tubular shape by the weld closing rolls 22.

A seam guide 30 is disposed upstream of the weld closing rolls 22 and guides the edges of the formed metal strip 10 so that the seam 28 of the formed metal tube will be aligned with the electrode 27 (FIG. 2) of the arc welding head 26. The seam guide 30, in a conventional manner, assures that the seam 28 will be correctly positioned relative to electrode 27 of the arc welder head 26 to produce a proper welding of the seam. The seam guide 30 is also mounted on the base plate 24 and is displaced with the base plate 24 and the weld closing rolls 22.

An aperture 32 is provided through the vertical support member 16 permitting an actuator bracket 34 attached to the reverse side of the base plate 24 to extend through the support member 16. An L-shaped actuator 36 is pivotably attached to the actuator bracket 34 by means of a pivot fastener 38 illustrated as a nut and bolt (FIG. 3). The L-shaped actuator 36 has a handle 40 which extends transversely beyond the edge of the support member 16 and a crank arm 42 substantially perpendicular to the handle 40. One end of a connector arm 44 is pivotably connected to the distal end of the crank arm 42 by a pivot fastener 46 illustrated as a nut and bolt while the other end of the connector arm 44 is pivotably connected to a stationary member 48 by a pivot connector 50. The stationary member 48 is fixedly attached to a mounted bracket 52 which, in turn, is attached to the support member 16. A handle guide 54 is attached to the guide member 20 (FIG. 2) and limits the angular displacement of the handle 40 of the L-shaped actuator 36. Catches 56 and 58 may be provided to retain the handle 40 in both the horizontal and depressed positions, respectively. The catches 56 and 58 may be rigid or resilient members as is known in the art.

Preferably, when the handle 40 is in the horizontal position, the crank arm 42 and the connector arm 44 are disposed at a small angle to each other in an overcenter locking arrangement, preventing the linear displacement of base plate 24 in a downward direction by gravity or external forces applied to the base plate 24. As shown in FIG. 4, the pivotable displacement of the handle 40 of the L-shaped actuator 36 in the direction indicated by arrow 60 causes the crank arm 42 and the connector arm 44 to be displaced from their generally vertical orientation to the angular orientation shown. This displacement of the crank arm and connector arm will lower the base plate 24 from its original operating position, shown in phantom, to the position shown in FIG. 4. The base plate 24 is thus displaced downward by a predetermined distance D. In the preferred embodiment, the distance D is approximately 25.4 millimeters (1.0 inches). Returning the handle 40 to the horizontal position will raise the base plate 24 to its original operating position in which the crank arm 42 and the connector arm 44 will be placed in the overcenter locked position.

In operation, when the tube forming machine has to be stopped to add new stock, sharpening the arc welding electrode or for any other reasons, the operator, before restarting the tube forming machine, will move the handle 40 of the actuator 36 to the lowered position as indicated in FIG. 4. This lowers the base plate 24 and linearly displaces the arc welder head 26, the welding closing rolls 22, the seam guide 30 and the forming rolls 12 downward a predetermined distance so that the arc welding head 26 is aligned with a previously welded portion of the seam 28. Upon restarting the tube forming machine, the operator slowly raises the handle 40 to the horizontal position shown in FIG. 3. During the raising of the handle 40, the arc welding head 26 will overweld the previously welded portion of the tube then continue to weld the seam 28 in a normal manner. The transition from the previously welded portion to the new welded portion will take place without introducing defects in the welded seam.

As an example, a tube forming machine embodying the displaceable arc welding head and welding rolls as described above produced a continuous length of welded tubing approximately 4,300 feet long without defects. Previously, the longest length of welded tubing produced by comparable tube forming machines having a stationary arc welding head and weld closing rollers was about 800 feet.

Figure 6:
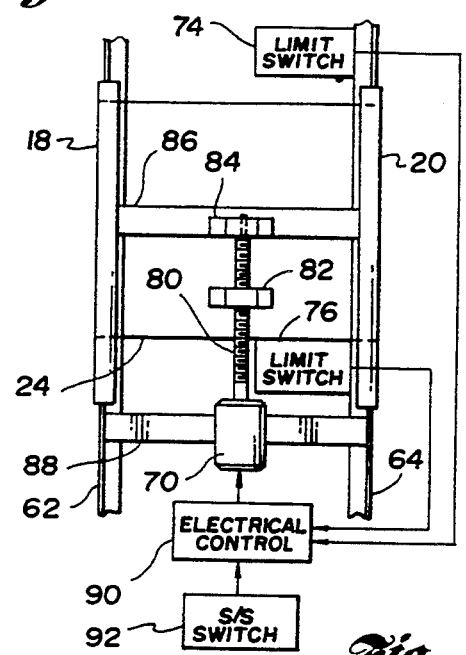
FIG. 6 shows a second electromechanical mechanism for displacing the base plate.

The mechanism for moving the arc welding head 26, weld closing rolls 22, seam guide 30, and the forming rolls 12 may be electrically actuated as shown in FIGS. 5 and 6. In the embodiment shown in FIG. 5, the support member 16 is a multi-piece frame having a pair of spatially separated vertical members 62 and 64. The members 62 and 64 may be lengths of angle iron, as shown, may be lengths of channel iron or any other shape as known in the art. The guides 18 and 20 straddle the vertical members 62 and 64, respectively, and are vertically displaceable therealong. As in the prior embodiment, the base plate 24 is attached to the vertical guides 18 and 20 and supports the arc weld head 26, the weld closing rollers 22 and seam guide 30 as shown in FIGS. 1 and 2.

A rack 66 is attached to the rear face of the base plate 24 which is engaged by a pinion 68 driven by a reversible electric motor 70. The pinion 68 and electric motor 70 are attached to a mounting plate 72 which is secured to vertical members 62 and 64. A pair of limit switches 74 and 76 limit the vertical displacement of the base plate 24 by the rack and pinion mechanism and the reversible electric motor 70. The limit switches 74 and 76 are connected in series between an UP/DOWN switch 78 and the reversible electric motor 70 such that when the UP/DOWN switch 88 is in the UP position, electrical power from an external source of electricity will energize the motor to raise the base plate 24 until it engages the limit switch 74. Upon engagement of the base plate 24 with the limit switch 74, electrical power to the electric motor 70 will be terminated with the base plate 24, the arc welding head 26 and the weld rolls 22 in their normal operating position.

Placing the UP/DOWN switch 78 in the DOWN position will energize the electric motor 70 to run in the reverse direction, lowering the base plate 24 until it engages limit switch 76 and terminates the electrical power to the electric motor.

In this embodiment, whenever the tube forming machine is stopped to add new stock or sharpen the arc welder electrode, the operator will actuate the UP/DOWN switch 78 to the DOWN position which energizes the electric motor to lower the base plate 24 to the desired position. When the tube forming machine is restarted, the operator will actuate the UP/DOWN switch 78 to energize the electric motor 70 to raise the base plate 24 to its normal operation position. The rate at which the base plate 24 is raised to its operating position from its lower position is controlled such that welding of the seam 28 is accomplished without holes or other defects. In this embodiment, because the rate at which the base plate 24 is raised to its operating position is controlled by the electric motor 70, the welded seam is produced with a more uniform and consistent integration of the prior seam weld with the new seam weld, significantly reducing defects in the welded seam.

The embodiment shown in FIG. 6 differs from the embodiment shown in FIG. 5 in several ways. In this embodiment, a threaded shaft 80 is attached to the output of the reversible electric motor 70 which engages a drive nut 82 fixedly attached to the base plate 24. The end of the threaded shaft 80 is necked down and received in a guide bearing 84 attached to a stationary bracket 86 connected to the vertical members 62 and 64 as described relative to FIG. 5. The reversible electric motor 70 is attached to a horizontal bracket 88 connected to the vertical members 62 and 64. The electric motor 70 receives electrical power from an electrical control 90 which is responsive to the START-STOP (S/S) switch 92 which starts and stops the tube forming machine. The electrical control 90 is responsive to the START-STOP switch 92 being activated to the STOP position to energize the electric motor 70 to lower the base plate 24, the attached arc welding head 26 and the weld rolls 22 to the desired lower or start position determined by limit switch 76.

Upon engaging limit switch 76, electrical power to the electric motor 70 will be terminated and the lowering of the base plate 24 will stop. Upon actuating the START-STOP switch 92 to the START position, the electric control 90 will, in a predetermined sequence, energize the electric motor 70 to raise the base plate 24 to its normal operating position where it will engage limit switch 74, terminating electrical power to the electric motor.

The embodiment illustrated in FIG. 6 has the advantage that the lowering and raising of the base plate 24, arc welding head 26, forming rolls 12 and weld closing rolls 22 are integrated with the stopping and starting of the tube welding machine and eliminates human error when the machine is stopped to add new stock, to sharpen the arc welding electrode or for any other reason.

The tube forming machine as shown in FIG. 7 may include a metal strip spool 94 providing a continuous supply of a metal strip 10 to the forming rolls 12, at least one wire spool 96 providing a wire 97 guided into the interior of the formed tube, and a ceramic powder hopper 98 providing a ceramic powder into the interior of the tube to electrically insulate the wire from the welded metal tube. As is known in the art, the ceramic powder from the hopper 98 is conducted into the formed tube by means of a funnel 100 which conducts the ceramic powder into the formed tube to a location downstream of the arc welding head 26 and includes means for maintaining the wire 97 coaxial with the formed tube. This type of arrangement is used to make sheathed cables for heater elements and shielded thermocouples for temperature measurements.

A take-up spool 102 may be provided to receive the tubing after being welded. As is known in the art, dies or other types of diameter reducing mechanism (not shown) may be disposed between the welder 26 and the take-up spool 102 to reduce the diameter of the welded tubing produced by the tube forming machine to a desired diameter.

Having disclosed a mechanism for a tube forming machine which permits the tube forming machine to be stopped and restarred without resulting in defects of the welded seam, it is understood that those skilled in the art may make certain changes or improvements to the disclosed mechanism within the scope of the invention as set forth in the appended claims.

What is claimed is:

1. A machine for making welded tubing from a flat metal strip comprising:

a support structure;

a base plate slidably attached to said support structure, said base plate displaceable in a first direction between a normal operating position and a start position;

at least one pair of forming rolls rotatably attached to said base plate for partially forming a received flat metal strip into a tubular form;

a pair of weld closing rolls rotatably attached to said base plate at a location downstream from said at least one pair of forming rolls, said weld closing rolls completing the forming of the received metal strip into said tubular form, the longitudinal edges of said metal strip forming a longitudinal seam;

welding means attached to said base plate downstream of said pair of weld closing rolls for welding said longitudinal edges of said metal strip to each other to seal said seam; and means for displacing said base plate from said operating position to said start position and for displacing said base plate from said start position to said operating position, said base plate in said start position locating said welding means over a previously welded portion of said longitudinal seam.

2. The machine of claim 1 further comprising a seam guide disposed between said at least one pair of forming rolls and said weld closing rolls to align said longitudinal seam with said welding means.

3. The machine of claim 1 wherein said welding means is an arc welder having a welding head, said welding head having an electrode aligned with said longitudinal seam downstream of said pair of closing rolls.

4. The machine of claim 1 wherein said means for displacing is a mechanical linkage which is manually actuated.

5. The machine of claim 4 wherein said mechanical linkage comprises:
an L-shaped actuator pivotably attached to said base plate, said actuator having a handle and a crank arm substantially perpendicular to said handle;
a stationary member fixedly attached to said support structure at a location displaced from said actuator; and
a connector arm pivotably attached at one end to a distal end of said crank arm and pivotably attached at its opposite end to said stationary member, said crank arm and said connector arm being substantially parallel to each other when said handle is disposed transverse said first direction of displacement of said base plate.

6. The machine of claim 5 wherein said crank arm and said connector arm when in said substantially parallel state are disposed at a small angle relative to each other in an overcenter locking state.

7. The machine of claim 1 wherein said means for displacing comprises:
a reversible electric motor having a rotary output;
a mechanical link between said rotary output and said base plate, said mechanical link displacing said base plate from said start position to said operating position in response to said rotary output of said electric motor rotating in a first direction and displacing said base plate from said operating position to said start position in response to said rotary output rotating in a second direction, reversed from said first direction; and
a switch having a first state providing electrical power to said electric motor to rotate said rotary output in said first direction and a second state providing electrical power to said electric motor to rotate said rotary output in said second direction.

8. The machine of claim 7 further including a first limit switch for terminating electrical power to said electric motor in response to said switch being in said first state and said base plate being in said operating position, and a second limit switch for terminating electrical power to said electric motor in response to said switch being in said second state and said base plate being in said start position.

9. The machine of claim 1 wherein said means for displacing comprises:
a reversible electric motor having a rotary output;
a mechanical link connecting said rotary output, said base plate, said mechanical link displacing said base plate from said start position toward said operating position in response to said rotary output rotating in a first direction and displacing said base plate from said operating position toward said start position in response to said rotary output rotating in a second direction, reverse from said first direction;
a START/STOP switch having a first state starting said machine and a second state stopping said machine; and
an electronic control responsive to said START/STOP switch being placed in said second state to provide electrical power to said electric motor to rotate said rotary output in said second direction and responsive to said START/STOP switch being placed in said first state to provide electrical power to said electric motor to rotate said rotary output in said first direction.

10. The machine of claim 9 further including means for detecting said base plate in said operating position to generate a first signal causing said electrical control to terminate electrical power provided to said electric motor when said START/STOP switch is in said first state and means for detecting said base plate being in said start position to generate a second signal causing said electrical control to terminate electrical power provided to said electric motor when said START/STOP switch is in said second state.

11. A method for operating a machine for forming a tube from a metal strip, said machine having at least one pair of forming rolls, a pair of weld closing rolls, and a welder for welding a seam formed by the longitudinal edges of the metal strip after being formed by the weld closing rolls, said method comprising the steps of:
longitudinally displacing from a normal operation location at least said welder and said weld closing rolls to a start position selected to place said welder over a previously welded portion of said seam in response to said machine being stopped; and
longitudinally displacing at least said welder and said weld closing rolls to said normal operating location in response to said machine being started, said welder overwelding said previously welded portion of said seam during said longitudinal displacement and continuing to weld the seam formed by said pair of weld closing rolls thereafter.

12. The method of claim 11 wherein at least said welder and said pair of weld closing rolls are mounted on a common base plate longitudinally displaceable relative to said formed tube, said first step of longitudinally displacing comprises the step of manually displacing a handle of a mechanical actuator attached to said base plate to a first position to displace said base plate to said start position placing said welder over said previously welded portion of said seam when said machine is stopped and wherein said second step of displacing comprises the step of manually displacing said handle of said mechanical actuator from said first position to a second position to displace said base plate from said start position to said operating position in which said welder and said weld closing rolls are in said normal operating location.

13. The method of claim 11 wherein at least said welder and said pair of weld closing rolls are mounted on a base plate longitudinally displaceable relative to said formed tube, said first step of longitudinally displacing comprises the step of providing electrical power to a reversible electric motor having a rotary output mechanically linked to said base plate to longitudinally displace said base plate to said start position, which places said welder over a previously welded portion of said seam when said machine is stopped, and wherein said second step of longitudinally displacing comprises the step of providing electrical power to said reversible electric motor to longitudinally displace said base plate to said operating position which places said welder and weld closing rolls in said normal operating location.

14. The method of claim 11 wherein said machine has a START/STOP switch having a first state placing said machine in operation and a second state terminating the operation of said machine and wherein at least said welder and weld closing rolls are mounted on a common base plate longitudinally displaceable relative to said formed tube, said first step of longitudinally displacing comprises the steps of:

providing electrical power to an electric motor having a rotary output in response to said START/STOP switch being placed in said first state;

displacing said base plate toward said operating position by a mechanical link connected to said rotary output; and terminating said electrical power to said electric motor in response to said base plate being displaced to said operating position; and wherein said second step of longitudinally displacing comprises the steps of:

providing electrical power to said electric motor in response to said START/STOP switch being placed in said second state;

displacing said base plate toward said start position by a mechanical link connected to said rotary output; and terminating said electrical power to said electric motor in response to said base plate being displaced to said start position.

15. The method of claim 12 wherein said machine has a seam guide mounted on said base plate between said at least one pair of forming rolls and said pair of weld closing rolls to align said seam with said welder.

16. The method of claim 15 wherein said at least one pair of forming rolls are mounted on said base plate.

17. The method of claim 13 wherein said machine has a seam guide mounted on said base plate between said at least one pair of forming rolls and said weld closing rolls to align said seam with said welder.

18. The method of claim 17 wherein said at least one pair of forming rolls are mounted on said base plate.

19. The method of claim 14 wherein said machine has a seam guide mounted on said base plate between said at least one pair of forming rolls and said pair of weld closing rolls to align said seam with said welder.

20. The method of claim 19 wherein said at least one pair of forming rolls are mounted on said base plate.

21. A hollow tube forming machine comprising:

a support structure;

a base plate slidably mounted on said support structure, said base plate being displaceable between an operating position and a start position;

a metal strip source providing a predetermined length of a flat metal strip, said flat metal strip having longitudinal edges on opposite sides thereof;

at least one pair of forming rolls which partially form said flat metal strip into a tubular form;

a pair of weld closing rolls disposed downstream of said at least one pair of forming rolls, said weld closing rolls rotatably attached to said base plate and movable therewith, said pair of weld closing rolls completing the forming of said flat metal strip into said tubular form, the longitudinal edges of said formed flat metal strip forming a longitudinal seam;

welding means attached to said base plate downstream of said pair of weld closing rolls for welding said longitudinal edges to each other to seal said longitudinal seam; and means for displacing said base plate between said operating position and said start position, said base plate in said start position locating said welding means over a previously welded portion of said longitudinal seam.

22. The machine of claim 21 further comprising a seam guide disposed between said at least one pair of forming rolls and said weld closing rolls to align said longitudinal seam with said welding means.

23. The machine of claim 21 further comprising:

a wire source providing at least one continuous length of wire; and means for inserting said at least one length of wire into said formed tube prior to said weld closing rolls.

24. The machine of claim 23 further comprising:

a source of ceramic powder; and means for conveying said ceramic powder into said tube at a location downstream of said welder means, said ceramic powder insulating said at least one length of continuous wire from said formed tube.

25. The machine of claim 22 wherein said seam guide is attached to said base plate and is displaceable therewith.

26. The machine of claim 21 wherein said at least one pair of forming rolls are rotatably connected to said base plate and are displaceable therewith.

27. The machine of claim 21 wherein said means for displacing is a manually operated mechanical actuator connected between said support structure and said base plate.

28. The machine of claim 21 wherein said means for displacing comprises:

an electric motor attached to said support structure, said electric motor having a rotary output;

a mechanical linkage connected between said rotary output and said base plate, said mechanical linkage responsive to the rotation of said rotary output to longitudinally displace said base plate; and switch means having a first state energizing said electric motor to rotate said rotary output, activating said mechanical linkage to displace said base plate from said start position to said operating position and having a second state energizing said electric motor to rotate said rotary output, activating said mechanical linkage to displace said base plate from said operating position to said start position.

29. The machine of claim 28 wherein said electric motor is a reversible electric motor having a rotary output which rotates in a forward direction in response to said first state of said switch means and rotates in a reverse direction in response to said second state of said switch means.

30. The machine of claim 21 wherein said machine has a START/STOP switch having a start state providing electrical power to said machine and switchable to a stop state terminating electrical power to said machine, said means for displacing comprises:

an electric motor, said electric motor having a rotary output;

a mechanical linkage connected between said rotary output, said mechanical linkage responsive to the rotation of said rotary output to longitudinally displace said base plate relative to said support structure; and an electrical control for providing electrical power to said electric motor to rotate said rotary output in a forward direction in response to said START/STOP switch being placed in said start state, the rotation of said rotary output in said forward direction activating said mechanical linkage to displace said base plate from said start position to said operating position, said electrical control providing electrical power to said electric motor to rotate said rotary output in a reverse direction in response to said START/STOP switch being placed in said stop state, the rotation of said rotary output in said reverse direction actuating said mechanical linkage to displace said base plate from said operating position to said start position.

31. The machine of claim 30 wherein said electrical control includes first means for detecting said base plate being in said operating position to terminate electrical power to said electric motor when said START/STOP switch is in said start position and second means for detecting said base plate being in said start position to terminate electrical power to said electric motor when said START/STOP switch is in said stop state.

* * * * *